United States Patent
Finkelstein et al.

(10) Patent No.: US 10,742,716 B1
(45) Date of Patent: Aug. 11, 2020

(54) DISTRIBUTED PROCESSING FOR CONTENT PERSONALIZATION

(71) Applicant: Amazon Technologies, Inc., Reno, NV (US)

(72) Inventors: Adam James Finkelstein, Seattle, WA (US); David Akira Gingrich, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 558 days.

(21) Appl. No.: 14/108,256

(22) Filed: Dec. 16, 2013

(51) Int. Cl.
*H04L 29/08* (2006.01)
*G06T 1/20* (2006.01)
(Continued)

(52) U.S. Cl.
CPC ............ *H04L 67/10* (2013.01); *G06F 3/1423* (2013.01); *G06F 9/44* (2013.01); *G06F 16/24569* (2019.01); *G06T 1/20* (2013.01); *G06T 9/20* (2013.01); *G06T 15/005* (2013.01); *H04L 67/1093* (2013.01); *H04L 67/22* (2013.01); *H04L 67/306* (2013.01)

(58) Field of Classification Search
CPC ....... H04L 67/10; H04L 67/306; H04L 67/22; H04L 67/1093; G06F 9/44; G06F 16/24569; G06F 3/1423; G06T 1/20; G06T 9/20; G06T 15/005
See application file for complete search history.

(56) References Cited

U.S. PATENT DOCUMENTS 7,853,630 B2 * 12/2010 Martino ............ G06F 17/30702
707/999.003
8,099,315 B2 * 1/2012 Amento ................ G06Q 30/02
705/26.7
(Continued)

OTHER PUBLICATIONS

Stuart, Jeff A. et al., "Multi-GPU MapReduce on GPU Clusters", in Proceedings of IPDPS-11, 25th International Parallel and Distributed Computing Symposium, Anchorage, AK, USA, (May 16-20, 2011), pp. 1068-1079.
(Continued)

*Primary Examiner* — Patrice L Winder
*Assistant Examiner* — Angela M. Widhalm De Rodrig
(74) *Attorney, Agent, or Firm* — Davis Wright Tremaine LLP

(57) ABSTRACT

A digital media service distributes digital media content to a plurality of devices in a graphical processing unit based distributed cluster and transmits executable instructions to these devices to initiate a collaborative filtering algorithm. Accordingly, the graphical processing unit in each of the devices, configured to utilize the collaborative filtering algorithm, may generate one or more co-occurrence vectors comprising similarities among a user's interactions with the digital media content and other users' interactions with the digital media content. These co-occurrence vectors are transmitted to the digital media service, which may create a matrix based at least in part on these vectors to determine personalized digital media content that is to be distributed to each of the devices in the distributed cluster. Accordingly, the personalized digital media content is distributed to each device in the distributed cluster.

20 Claims, 9 Drawing Sheets

(51) Int. Cl.
*G06T 15/00* (2011.01)
*G06F 3/14* (2006.01)
*G06F 9/44* (2018.01)
*G06T 9/20* (2006.01)
*G06F 16/245* (2019.01)

(56) References Cited

U.S. PATENT DOCUMENTS

| | | | |
|---|---|---|---|
| 8,484,226 B2 * | 7/2013 | Elliott-McCrea | G06F 17/30038 707/751 |
| 8,562,440 B2 * | 10/2013 | Nickell | A63F 13/12 463/40 |
| 8,572,169 B2 * | 10/2013 | Partovi | G06Q 10/10 709/204 |
| 8,651,961 B2 * | 2/2014 | Muller | A63F 13/12 463/42 |
| 8,676,736 B2 * | 3/2014 | Pilaszy | G06Q 10/00 706/46 |
| 8,860,741 B1 * | 10/2014 | Juffa | G09G 5/36 345/530 |
| 2007/0239610 A1 * | 10/2007 | Lemelson | G06Q 10/00 705/51 |
| 2007/0255707 A1 * | 11/2007 | Tresser | G06F 17/30592 |
| 2010/0083303 A1 * | 4/2010 | Redei | H04N 7/17318 725/32 |
| 2010/0241699 A1 * | 9/2010 | Muthukumarasamy | G06F 17/30035 709/203 |
| 2010/0306249 A1 * | 12/2010 | Hill | G06F 17/30867 707/769 |
| 2013/0038618 A1 * | 2/2013 | Urbach | G06F 9/5005 345/522 |
| 2013/0090163 A1 * | 4/2013 | Edson | A63F 13/12 463/31 |
| 2013/0091217 A1 * | 4/2013 | Schneider | G06Q 50/01 709/204 |
| 2013/0249928 A1 * | 9/2013 | Buhr | G06F 17/30 345/589 |
| 2013/0318187 A1 * | 11/2013 | Knight | G06Q 10/10 709/206 |
| 2014/0059479 A1 * | 2/2014 | Hamburg | G06F 17/30274 715/781 |
| 2014/0181121 A1 * | 6/2014 | Nice | G06F 17/16 707/748 |
| 2014/0236989 A1 * | 8/2014 | Pronk | H04N 21/4756 707/769 |
| 2014/0244561 A1 * | 8/2014 | Cheng | G06Q 50/01 706/46 |
| 2014/0257795 A1 * | 9/2014 | Birnbaum | G06F 17/2765 704/9 |
| 2014/0259056 A1 * | 9/2014 | Grusd | H04N 21/8583 725/34 |
| 2014/0375659 A1 * | 12/2014 | McGuire | G09G 5/363 345/520 |
| 2015/0089524 A1 * | 3/2015 | Cremonesi | H04N 21/252 725/14 |
| 2015/0310131 A1 * | 10/2015 | Greystoke | G06F 17/30991 707/722 |

OTHER PUBLICATIONS

Zaki, Mohammed Javeed and Ching-Jiu Hsiao, "CHARM: An Efficient Algorithm for Closed Itemset Mining", in SDM, (2002), vol. 2, pp. 457-473.

Stuart, J.A. et al., "Multi-GPU MapReduce on GPO Clusters," in Proceedings of the 25th IEEE International Parallel and Distributed Computing Symposium, Anchorage, AK (May 16-20, 2011), pp. 1068-1079.

Zaki, M.J. et al., "CHARM: An Efficient Algorithm for Closed Itemset Mining," in Proceedings of the 2002 SIAM International Conference on Data Mining, Arlington, VA (Apr. 11-13, 2002), pp. 457-473.

Yu, K. et al., "Instance Selection Techniques for Memory-Based Collaborative Filtering," in Proceedings of the 2002 SIAM International Conference on Data Mining, Arlington, VA (Apr. 11-13, 2002), pp. 59-74.

* cited by examiner

DISTRIBUTED PROCESSING FOR CONTENT PERSONALIZATION

BACKGROUND

The consumption of media over a variety of networks has increased over time through the use of various applications, such as online video games, music streaming applications, video streaming applications and the like. Accordingly, providers of these applications often present users with personalized content based at least in part on each user's preferences and actions within the applications. For instance, methods such as collaborative filtering exist, which allow users to be recommended specialized content based at least in part on preferences and actions by other users. However, such methods often involve offline compilation. This offline compilation may be slow and expensive and, as a result, are typically not performed on individual sessions of online media consumption.

BRIEF DESCRIPTION OF THE DRAWINGS

Various embodiments in accordance with the present disclosure will be described with reference to the drawings, in which.

DETAILED DESCRIPTION

Figure 1:
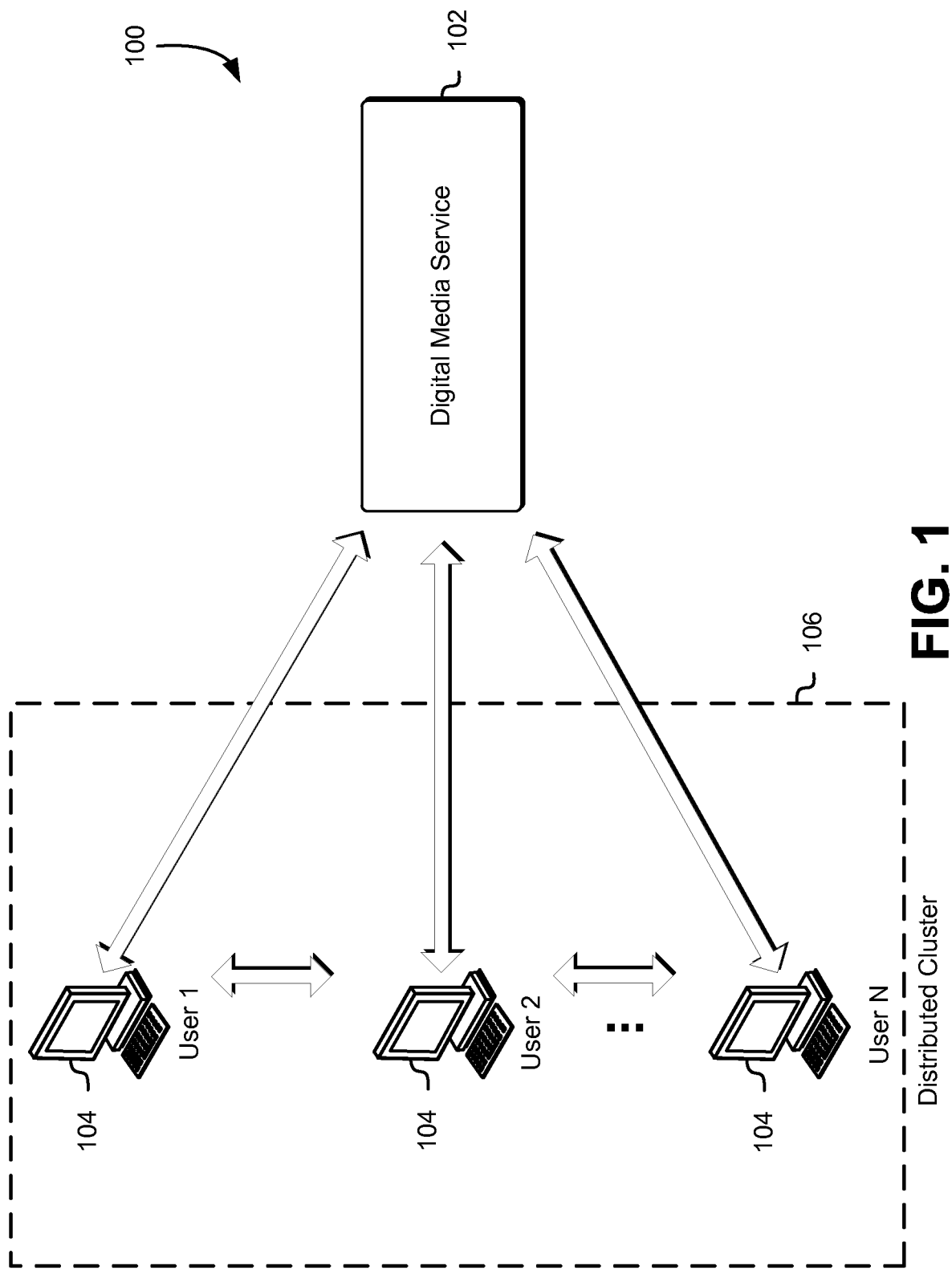
FIG. 1 shows an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to the dynamic creation of graphics processing unit (GPU)-based distributed clusters for providing personalization features to one or more users. In an embodiment, a digital media service may receive a request from an entity (e.g., a user through an associated computing device) to access media content (e.g., online games, videos, music, etc.) stored and managed by the digital media service. The entity may be a customer of the digital media service who may utilize a user computer system device to remotely interact with media content on demand. When the customer uses his/her user computer system device to access the digital media service, the digital media service may determine whether the user computer system device may be added to a GPU-based distributed cluster. For instance, the customer may have specified, through an application installed on the user computer system device, that the device may be added to a GPU-based distributed cluster in order to obtain personalized media content from the digital media service. Accordingly, if the user computer system device has been authorized to join a GPU-based distributed cluster, the digital media service may identify an existing cluster that the device may join or, if there are not clusters available, build a new GPU-based distributed cluster and join the device to this cluster, as well as other user computer system devices that meet certain criteria for joining this new cluster.

In an embodiment, the GPU-based distributed cluster comprises a plurality of hosts (e.g., user computer system devices), each host configured to communicate with the other hosts within the cluster and with the digital media service. Accordingly, each host within the GPU-based distributed cluster may receive media content from the digital media service. As the users of the various hosts within the GPU-based distributed cluster interact with the media content, the cluster may analyze these interactions and perform one or more calculations (e.g., collaborative filtering) to identify similarities in user interactions with the media content. These calculations may be transmitted to the digital media service, where the digital media service may use these calculations to provide personalized content to the plurality of hosts within the GPU-based distributed cluster.

In an embodiment, when the various hosts operating within the GPU-based distributed cluster initiates the collaborative filtering algorithm (or another algorithm that is used to analyze user interaction with content, e.g. by analyzing the content being consumed itself), each host transmits data to the other hosts within the cluster to provide information regarding a user's interactions with the media content. For instance, the GPU within a host may be configured to process and obtain data regarding the images, sounds, user responses to the images and/or sounds and other information related to the media content. This data may then be transmitted to the other hosts within the GPU-based distributed cluster. Accordingly, each host may utilize the data received from the other hosts to build a co-occurrence vector, which may include the similarities between the interactions of the user and the interactions of all the other users in the distributed cluster. These co-occurrence vectors may be transmitted to the digital media service, where the digital media service may build a matrix based at least in part on all co-occurrence vectors to determine what personalized content is to be generated.

In an embodiment, the GPU-based distributed cluster additionally uses the co-occurrence vectors to provide personalized content to the hosts that comprise the cluster. For instance, if a user utilizing a host within the distributed cluster has accessed media content from the digital media service, the host may receive data from other hosts to create the co-occurrence vectors. If the co-occurrence vectors generated include similarities between the media content accessed by the user and the media content accessed by other users within the cluster, the GPU within the host utilized by the user may generate personalized content based at least in part on the similarities included in the co-occurrence vectors. For instance, if the user is listening to a song accessed from the digital media service, and other users are listening to similar songs or artists, the GPU within the user's host may inform the user that other users within the GPU-based distributed cluster are listening to similar songs/artists. Accordingly, the GPU may cause the host to display these similar songs/artists and enable the user to access these similar songs/artists through the digital media service.

In this manner, GPU-based distributed clusters may be created and used to analyze user interactions with user computer system devices and, based at least in part on the user interactions with all devices in the cluster, distribute personalized content to the devices within the cluster. In addition, the techniques described and suggested herein facilitate additional technical advantages. For example, because, in some embodiments, the GPU-based distributed cluster is created using user computer system devices with similar configurations, collection of data between these devices within the cluster may not require additional configuration in order to be readable in different computer systems. This, in turn, may reduce the computational power required to analyze user interactions with media content and to determine the co-occurrence vectors based at least in part on data received from other hosts within the GPU-based distributed cluster. While GPUs are used throughout the present disclosure for the purpose of illustration, other types of processors may be used.

FIG. 1 shows an illustrative example of an environment 100 in which various embodiments can be implemented. In the environment 100, a digital media service 102 may provide various digital media content to customers of a computing resource service provider or any other service provider that hosts various computing resources on behalf of one or more customers. For example, a computing resource service provider may operate one or more facilities that are used to host various computing hardware resources, such as hardware servers, data storage devices, network devices, and other equipment, such as server racks, networking cables and the like. The computing resource service provider may utilize its computing hardware resources to operate one or more services. Such services may include the aforementioned digital media service 102, which may enable customers of the computing resource service provider to remotely access digital media content to support the customers' operations while reducing or even eliminating the need of the customers to invest in physical equipment. Other example services include, but are not limited to, various data storage services (object-based data storage services, archival data storage services, database services and the like), program execution services and other services.

As noted above, the digital media service 102 may enable customers to remotely access digital media content to support the customers' operations while reducing or even eliminating the need of the customers to invest in physical equipment. Accordingly, the digital media service 102 may comprise various computing hardware resources for storing and making available this digital media content. The digital media content that may be made available through the digital media service 102 may include, but is not limited to, videos, music, video games, electronic books (eBooks) and the like. The digital media service 102 may be configured to provide digital media content to customers on demand. For instance, a customer may transmit, through a network, one or more appropriately configured commands (e.g., the commands may be formatted in a manner acceptable to the system receiving the commands and may include all information necessary to cause the receiving system to fulfill the commands) to the digital media service 102 to request access to specific digital media content. Accordingly, the digital media service 102 may, in response to the request, transmit the digital media service to the customer.

Accordingly, as illustrated in FIG. 1, the environment includes a plurality of users 104. Each user 104 may be an individual or organization that could utilize the digital media service 102 to remotely access digital media content to support his or her operations or for his or her own personal purposes (e.g., leisure, personal interest, research, etc.). Each user 104 may, through a user computer system device, utilize a digital media service interface to submit one or more requests to the digital media service 102 to access digital media content. This digital media service interface may be a software application installed on the user computer system device, a website accessed through a browser application installed on the user computer system device and the like. It should be noted that while the use of a personal computer system device, as illustrated in FIG. 1, is used extensively throughout the present disclosure for the purpose of illustration, other devices may be used to access the digital media service 102. For instance, a user 104 may utilize other devices, such as a mobile telephonic device (e.g., smartphone), eBook reader, tablet computer device, laptop computer device, video gaming console and the like.

Each user computer system device used by a user 104 may comprise one or more hardware components, including graphics processing units (GPUs), central processing units (CPUs), hard drives, random-access memory (RAM) chips and the like. Collectively, these hardware components may provide desirable capabilities for processing digital media content and creating a distributed cluster 106 for processing user 104 data and creating and distributing personalized content to each user 104 within the distributed cluster 106. For instance, many users 104 of the digital media service 102 may use user computer system devices that include powerful GPUs. These powerful GPUs may be necessary to support and process graphics-intensive content, such as online video games or other games requiring significant hardware acceleration. Accordingly, in an embodiment, the digital media service 102 configures an interface to enable a user 104 to specify whether the user's user computer system device can be added to a GPU-based distributed cluster 106. If the user 104 specifies that his/her user computer system device may be added to the GPU-based distributed cluster 106, the digital media service 102 may evaluate the user's 104 user computer system device to determine the system capabilities of the device and attempt to identify a GPU-based distributed cluster 106 that includes other devices with similar capabilities.

If the digital media service 102 identifies a GPU-based distributed cluster 106 comprising one or more user computer system devices with similar system capabilities to that of the user's 104 device, the digital media service 102 may add this user 104 to the GPU-based distributed cluster 106. Otherwise, the digital media service 102 may build a new GPU-based distributed cluster or wait until other users 104 have made their devices available for creation of a new cluster. Accordingly, the user 104 may utilize his/her user computer system device to access digital media content made available by the digital media service 102.

As each user 104 participating in the GPU-based distributed cluster 106 continues to utilize more digital media content provided by the digital media service 102, each user's user computer system device may transmit data to the other devices within the GPU-based distributed cluster 106 regarding the digital media content accessed by the user 104 and the interactions (e.g., cursor movements, button presses, item selections, etc.) with the digital media content. Accordingly, the GPU within each user's 104 user computer system device may utilize the data received from the other devices within the GPU-based distributed cluster 106 to perform one or more calculations to determine similarities between the user 104 and the other users within the GPU-based distributed cluster 106. For example, each user computer system device may utilize its GPU to calculate co-occurrence vectors based at least in part on similarities between the user 104 interactions with the digital media content and the interactions of the other users within the GPU-based distributed cluster 106. Accordingly, these co-occurrence vectors may be transmitted to the digital media service 102. The digital media service 102 may be configured to generate a matrix based at least in part on the received co-occurrence vectors and determine personalized media content to be distributed to the users 104 within the GPU-based distributed cluster.

Figure 2:
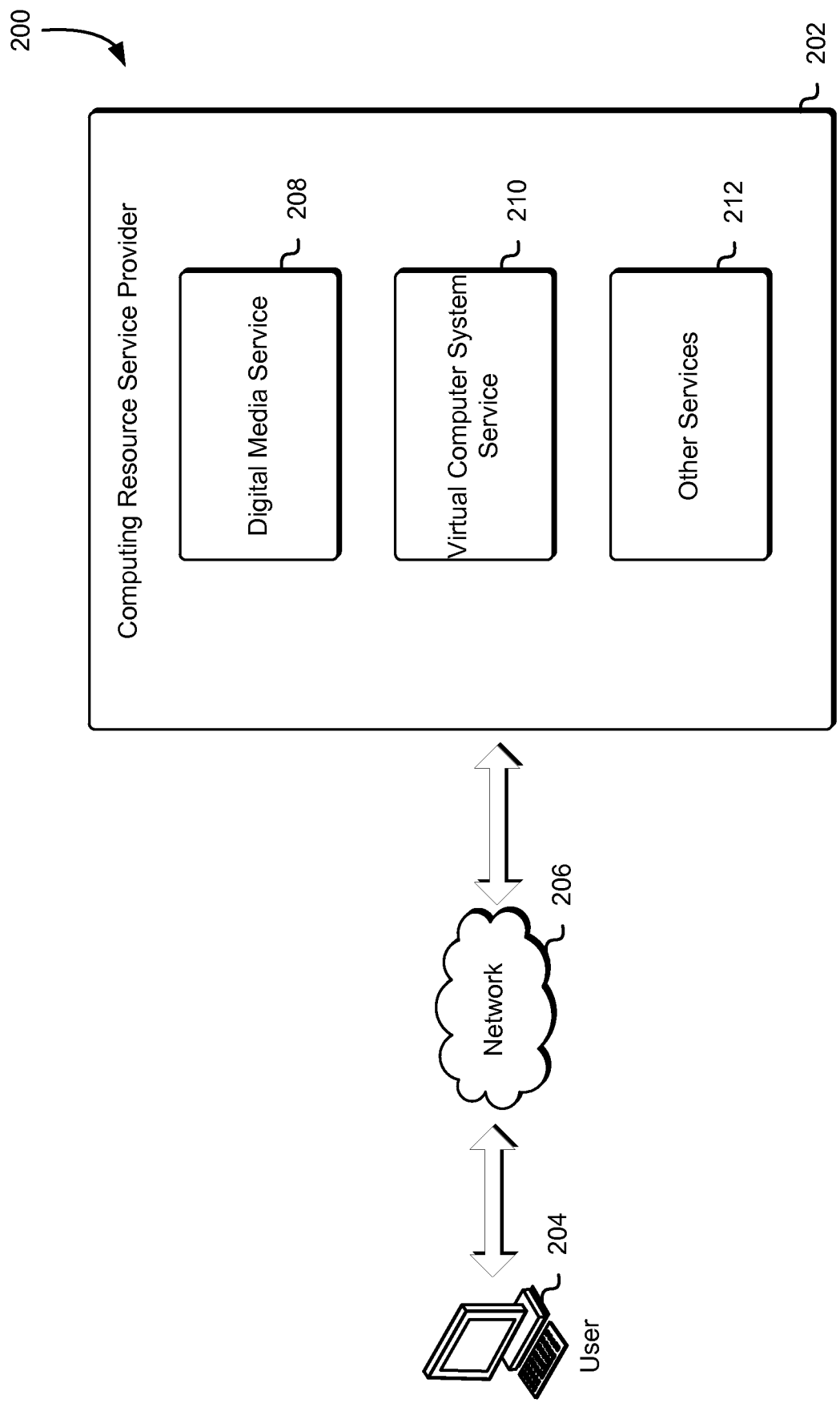
FIG. 2 shows an illustrative example of an environment in which various embodiments can be implemented.

FIG. 2 shows an illustrated example of an environment 200 in which various embodiments of the present disclosure may be practiced. In the environment 200, a computing resource service provider 202 may provide a variety of services to a user 204. As noted above, the user 204 may be an individual or organization that could utilize the various services provided by the computing resource service provider 202 to remotely access digital media content to support his or her operations or for his or her own personal purposes (e.g., leisure, personal interest, research, etc.). As illustrated in FIG. 2, the user 204 may communicate with the computing resource service provider 202 through one or more communications networks 206, such as the Internet. Some communications from the user 204 to the computing resource service provider 202 may cause the computing resource service provider 202 to operate in accordance with various techniques described herein or variations thereof.

As noted above, a computing resource service provider 202 may provide various computing resource services to its users. For instance, in this particular illustrative example, the computing resource service provider 202 provides at least two types of services. The services provided by the computing resource service provider 202, in this example, include a digital media service 208, a virtual computer system service 210 and one or more other services 212, although not all embodiments of the present disclosure will include all such services and additional services may be provided in addition to or as an alternative to services explicitly described herein.

The digital media service 208 may be a collection of computing resources configured to provide digital media content, including videos, music, online games and the like to its users 204 upon request. Users 204 of the computing resource service provider 202 may interact with the digital media service 208 through an interface to submit one or more requests for digital media content. In response to the request, the digital media service 208 may transmit the digital media content to the user 204 and allow the user 204 to utilize the content for his/her own purposes. The interface used to access the digital media service 208 may be included in a software application installed on a user computer system device, such as a personal computer system, owned and utilized by the user 204. Alternatively, the interface may be accessible through one or more communications networks 206, such as the Internet. The interface may contain certain security safeguards to ensure that the user 204 has authorization to access the digital media service 208. For instance, in order to access the digital media service 208, a user 204 may need to provide a username and a corresponding password or encryption key when using the interface. Additionally, requests submitted to the interface may require an electronic signature generated using a cryptographic key such that the electronic signature is verifiable by the digital media service 208.

The digital media service 208 interface may be configured to include an option for the user 204 to specify whether the user's user computer system device may be added to a GPU-based distributed cluster. If the user 204 specifies, through the interface, that his/her user computer system device may be added to a GPU-based distributed cluster, the digital media service 208 may transmit one or more appropriately configured application programming interface (API) calls to the user computer system device to determine the system capabilities of the device. For instance, the digital media service 208 may be configured to determine the GPU processing capabilities of the user computer system device, as well as the make and model of the GPU. Additionally, the digital media service 208 may determine the operating system installed on the user computer system device in order to ensure that all users 204 participating in the GPU-based distributed cluster utilize compatible software and hardware on their user computer system devices.

Once a user's 204 user computer system device has been added to a GPU-based distributed cluster, the digital media service 208 may transmit one or more appropriately configured API calls to each user computer system devices that comprise the GPU-based distributed cluster to initiate a collaborative filtering and/or other algorithm, such as a content-based filtering algorithms that take advantage of the processing capabilities of GPU clusters to analyze content and perform content-based filtering of images, sound, video and/or other content. Further, hybrid approaches that utilize multiple types of algorithms may be used. This algorithm may be used by the GPU in each of the user computer system devices to analyze user 204 interactions with the provided digital media content and transmit this information to the other devices within the GPU-based distributed cluster. In an embodiment, each user computer system device within the GPU-based distributed cluster receives this data from the other devices and, through the use of the GPU, performs one or more calculations to determine similarities between the user's 204 interactions with the digital media content and the received data. Accordingly, the user computer system device may be configured to transmit the calculations performed by the GPU to the digital media service 208.

The digital media service 208 may utilize the calculations received from each of the user computer system devices that comprise the GPU-based distributed cluster to identify or generate personalized content for each user 204 participating in the GPU-based distributed cluster as well for the GPU-distributed cluster as a whole. For example, if one or more users 204 participating in the GPU-distributed cluster interact with an online video game, where users 204 explore new areas and react to different stimuli in these areas, the digital media service 208 may, based at least in part on calculations performed by the GPUs owned by each user 204, generate new areas for the users 204 to explore, as well as different stimuli and adjustments to difficulty.

The virtual computer system service 210 may be a collection of computing resources configured to instantiate virtual machine instances onto virtual computer systems on behalf of the users 204 of the computing resource service provider 202. Users 204 of the computing resource service provider 202 may interact with the virtual computer system service 210 to provision and operate virtual computer systems that are instantiated on physical computing devices hosted (e.g., physical hosts) and operated by the computing resource service provider 202. The virtual computer systems may be used for various purposes, such as to operate as servers supporting a website. Other applications for the virtual computer systems may be to support database applications, electronic commerce applications, business applications and/or other applications.

The computing resource service provider 202 may additionally maintain one or more other services 212 based on the needs of its users 204. For instance, the computing resource service provider 202 may maintain a database service for its users 204. A database service may be a collection of computing resources that collectively operate to run one or more databases for one or more users 204. Users 204 of the computing resource service provider 202 may operate and manage a database from the database service by utilizing appropriately configured API calls to the service. This, in turn, may allow a user 204 to maintain and potentially scale the operations in the database. Others services may include, but are not limited to, object-level data storage services, object-level archival data storage services, block-level data storage services, services that manage other services and/or other services.

Figure 3:
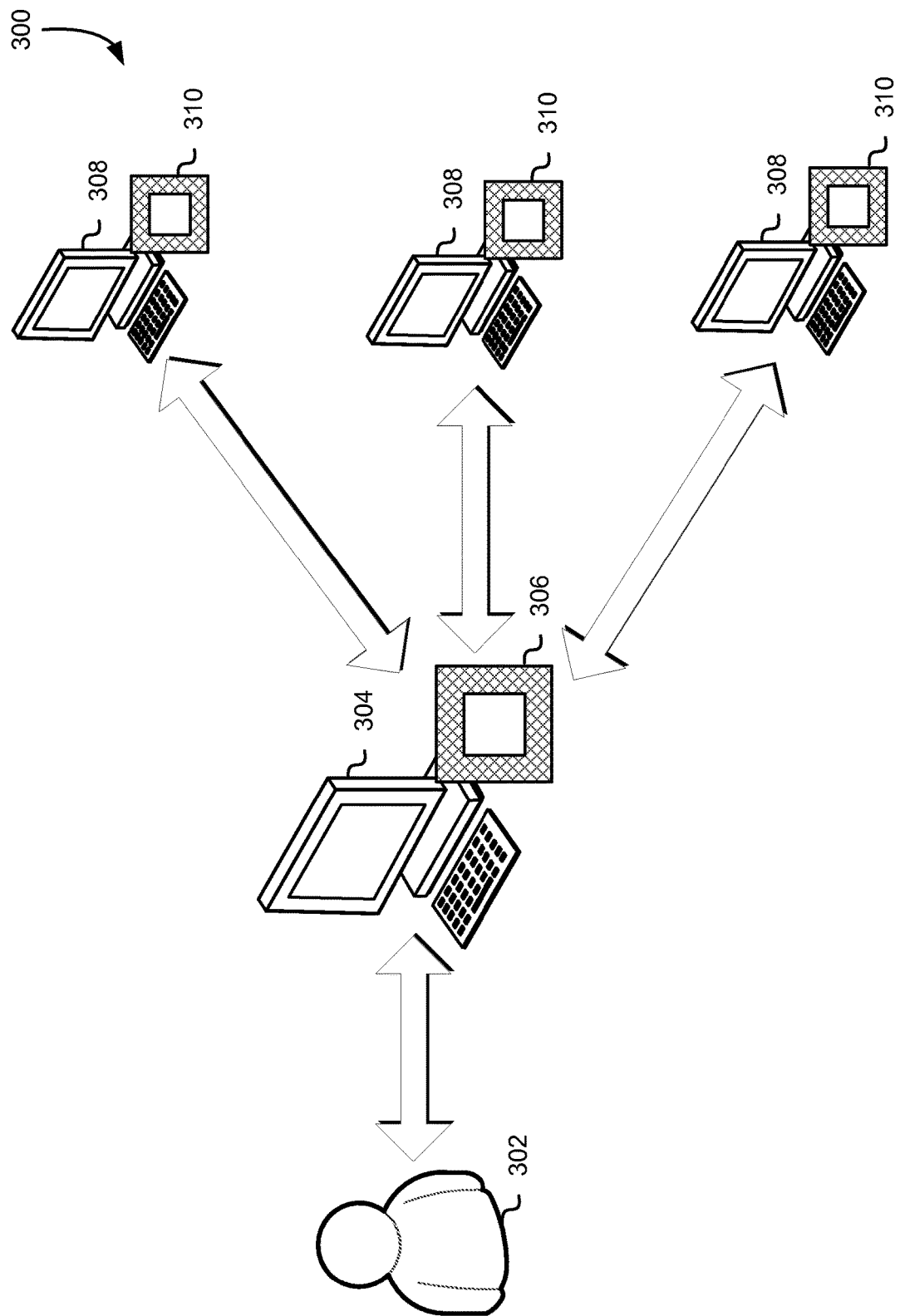
FIG. 3 shows an illustrative example of interactions between a user and other users within a graphics processing unit based distributed cluster in accordance with at least one embodiment.

As noted above, a digital media service may be used by one or more users to remotely access digital media content for a variety of uses. Each user may utilize a user computer system device to access the digital media service and to interact with the digital media content once it has been transmitted to the device. Further, each user may specify, through an interface provided by the digital media service, that the user computer system device may be added to a GPU-based distributed cluster in order to receive personalized digital media content from the digital media service and from other users participating in the cluster. Accordingly, FIG. 3 shows an illustrative example of an environment 300 that includes interactions between a user 302 and other users within a GPU-based distributed cluster in accordance with at least one embodiment. As noted above, a user 302 may interact with a user computer system device 304 to access the digital media service and participate within the GPU-based distributed cluster. The user computer system device 304 may comprise a variety of hardware components that collectively operate to perform one or more processes. For instance, the user computer system device 304 may comprise a GPU 306 configured to provide hardware acceleration for the creation of images and graphics to be displayed on a display (e.g., a monitor, touch-screen display, etc.)

In various user computer system device 304 configurations, the GPU 306 may comprise a plurality of microprocessors, each configured to perform memory-intensive calculations to render two dimensional and three dimensional graphics. Examples of such calculations include, but are not limited to, texture mapping, polygon rendering, rotation and translation of vertices into alternative coordinate systems, interpolation, extrapolation, shading and the like. As the processing power of the GPU 306 has expanded over time, the GPU 306 has also been used for other applications outside of graphical operations. For example, GPUs 306 have been used for various scientific and engineering applications outside of graphical processing.

When a user 302 utilizes his/her user computer system device 304 to access the digital media service, the user 302 may specify whether the user computer system device 304 may be added to a GPU-based distributed cluster. This cluster may comprise a plurality of other user computer system devices 308 operated by other users, collectively recording and analyzing user interactions with digital media content obtained from the digital media service. As such, each of these other user computer system devices 308 may each comprise its own GPU 310. Each GPU 306, 310 operating within this GPU-based distributed cluster may receive an appropriately configured API call from the digital media service to initiate a collaborative filtering algorithm. Accordingly, as the user 302 interacts with the digital media content received from the digital media service through the user computer system device 304, the GPU 306 operating within the user computer system device 304 may evaluate the user 302 interactions with the digital media content and cause the user computer system device 304 to transmit this data to the other user computer system devices 308 participating in the GPU-based distributed cluster.

Similarly, the other user computer system devices 308 participating within the GPU-based distributed cluster may transmit data based at least in part on other user interactions with digital media content to the user computer system device 304. Accordingly, the GPU 306, configured to determine similarities between user 302 interactions with the digital media content and data received from other user computer system devices 308, may determine if similarities exist between the interactions and generate one or more co-occurrence vectors. These vectors may illustrate the similarities, or lack thereof, that exist between the user 302 interactions and the interactions of the other users participating in the GPU-based distributed cluster. For instance, as will be illustrated in greater detail below, if a user 302 utilizes the user computer system device 304 to listen to a particular song, the user computer system device 304 may transmit information related to this song (e.g., artist name, song title, previously heard songs, volume level, etc.) to the other user computer system devices 308 within the GPU-based distributed cluster. The user computer system device 304 may also receive similar data from the other user computer system devices 308. Thus, the GPU 306 may analyze the information received from the other users and determine if similarities exist. If similarities do exist, the GPU 306 may cause the user computer system device 304 to display these similarities.

Figure 4:
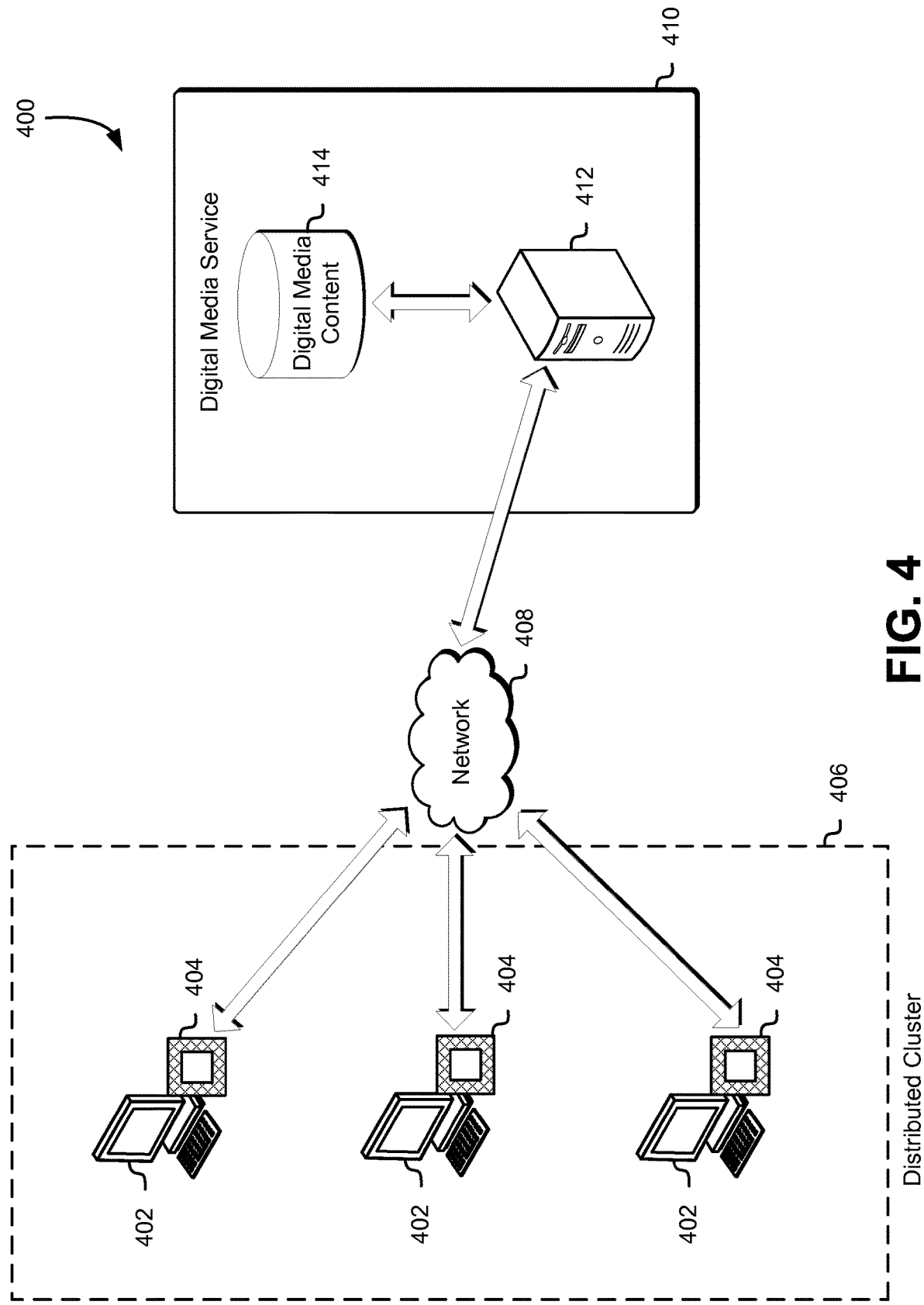
FIG. 4 shows an illustrative example of distribution of personalized content to one or more users in a graphics processing unit based distributed cluster in accordance with at least one embodiment.

In an embodiment, each user computer system device operating within the GPU-based distributed cluster transmits these co-occurrence vectors to the digital media service. Accordingly, as will be described in greater detail below, the digital media service may use these co-occurrence vectors to create or identify personalized digital media content that should be distributed to the plurality of users participating in the GPU-based distributed cluster. Accordingly, FIG. 4 shows an illustrative example of an environment 400 in which distribution of personalized content to one or more users in a GPU-based distributed cluster 406 in accordance with at least one embodiment. As in FIG. 3, the environment 400 includes a plurality of user computer system devices 402, each comprising a GPU 404 configured to perform one or more calculations based at least in part on user interactions with digital media content received from the digital media service 410, as well as data regarding these interactions from the other user computer system devices in the GPU-based distributed cluster 406.

As noted above, when a user utilizes a user computer system device 402 to access the digital media service 410, the user may specify whether the user computer system device 402 may be added to a GPU-based distributed cluster 406. For example, by adding the user computer system device 402 to a GPU-based distributed cluster 406, the user may be able to receive personalized media content from the digital media service 410, as well as from other users within the distributed cluster 406. For instance, each user computer system device 402 in the GPU-based distributed cluster 406 may be configured to transmit data, through the communications network 408, to the other devices within the GPU-based distributed cluster 406. This data may include a series of user interactions with the digital media content. As the users participating within the GPU-based distributed cluster 406 continue to utilize digital media content, the GPUs 404 operating within the user computer system devices 402 within the distributed cluster 406 may compute one or more co-occurrence vectors which may describe the similarities, or lack thereof, between a particular user's interactions with the digital media content and other user interactions within the distributed cluster 406 received from the other user computer system devices within the distributed cluster 406.

Accordingly, each user computer system device 402 participating in the GPU-based distributed cluster 406 may transmit, through one or more communications networks 408, such as the Internet, these co-occurrence vectors to one or more servers 412 managed and maintained by the digital media service 410 for further processing. The one or more servers 412 may be configured to generate a matrix based at least in part on the co-occurrence vectors received from all of the user computer system devices 402 within the GPU-based distributed cluster 406 and identify one or more sets of personalized media content that is to be provided to these devices 402. Accordingly, the one or more servers 412 may transmit one or more appropriately configured API calls to a digital media content data store 414 to obtain the personalized digital media content. The digital media content data store 414 may comprise a plurality of storage devices (e.g., solid-state drives or magnetic disk drives) necessary to persistently store digital media content and/or a variety of media components (e.g., image files, sound files, applications, etc.) which may be compiled to create digital media content for distribution to users of the digital media service 410.

Thus, in response to the appropriately configured API calls to the digital media content media data store 414, the digital media content data store 414 may transmit one or more digital media components or the requested digital media content to the one or more servers 412. If the digital media content data store 414 provides one or more digital media components to the one or more servers 412, the one or more servers 412 may compile these components to create, based at least in part on the matrix created from the received co-occurrence vectors, the personalized digital media content. Accordingly, the one or more servers 412 within the digital media service 410 may transmit, through the one or more communications networks 408, the personalized digital media content to the various user computer system devices 402 operating within the GPU-based distributed cluster 406. As the users interact with this newly received digital media content, the GPUs 404 within each user computer system device 402 operating within the GPU-based distributed cluster 406 may continue to analyze user interactions and obtain data from the other GPUs 404 to create new co-occurrence vectors. In this manner, the user computer system devices 402 operating within the GPU-based distributed cluster 406 may continue to receive personalized digital media content from the digital media service 410.

Figure 5:
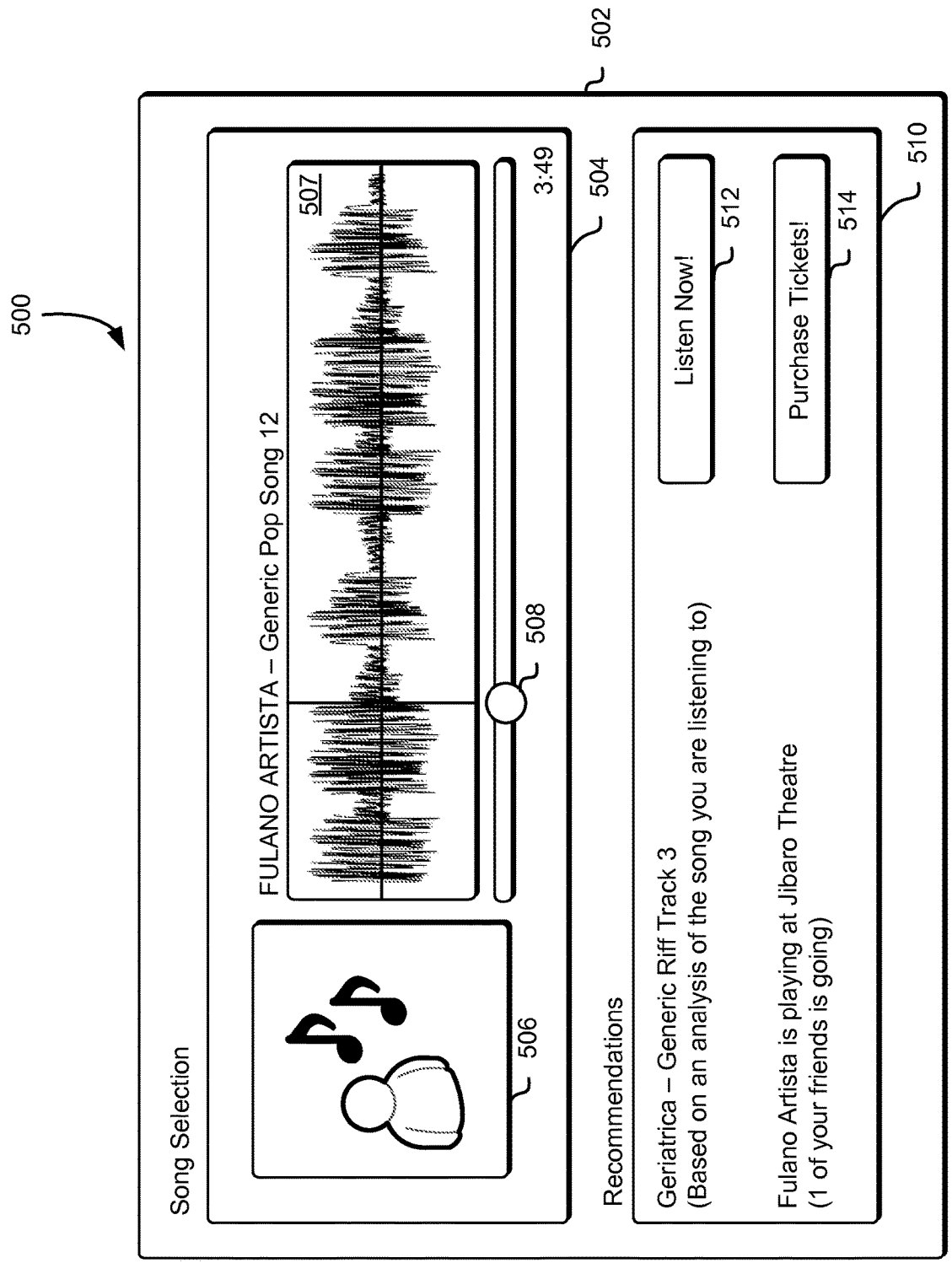
FIG. 5 shows an illustrative example of an interface that includes one or more personalization features provided to a user based at least in part on user preferences in accordance with at least one embodiment.

As noted above, a user may be able to access the digital media service through an interface in order to access digital media content, such as music, online games, video and other media. This interface may be a software application that can be installed on the user's user computer system device. Alternatively, the user may utilize a network browser to communicate, through one or more communications networks, such as the Internet, with the digital media service and access the digital media content through this browser. Accordingly, FIG. 5 shows an illustrative example of an interface 502 that includes one or more personalization features provided to a user based at least in part on user interactions with digital media content in accordance with at least one embodiment. As illustrated in FIG. 5, the interface 502 is configured to enable a user to access one or more songs available from the digital media service, the user's own music library, another user's music library, or some other service or library. While FIG. 5 illustrates an example of a music-based interface 502 for accessing the digital media service, the interface may comprise a variety of elements and may be configured for a variety of different media. For example, the interface 502 may be configured to display media content associated with an online video game. Alternatively, the interface 502 may be similar to the music-based interface except that users may use the interface 502 to access one or more videos. Other types of interfaces for different forms of digital media content are thus considered within the scope of the present disclosure.

In this illustrative example, the interface 502 includes a song selection window 504 and a recommendations window 510. The song selection window 504 may include a variety of display elements which the user can interact with and other elements that may be included for aesthetic appeal or informative purposes. For example, the song selection window 504 may include an album cover display window 506, which may include images from the commercial packaging for the physical album that includes the selected song. The album cover display window 506 may alternatively display other images, such as an image of the artist, an image the user has selected, and other images. The song selection window 504 may further include a waveform display window 507, which may include an abstract representation of the frequency and amplitude over time of the particular selected song. Additionally, the song selection window 504 may include a song selection slider 508, which a user may utilize to listen to a particular section of the selected song. The song selection window 504 may include additional elements, such as the names of the artist and the selected song, the duration of the selected song, the name of the album that includes the selected song and other elements.

The recommendations window 510 may include a variety of elements based at least in part on the song selected in the song selection window 504. As noted above, if a user has specified that the user computer system device may be added to a GPU-based distributed cluster, the digital media service may transmit one or more appropriately configured API calls to the GPUs operating within the user computer system devices in the GPU-based distributed cluster to initiate a collaborative filtering algorithm. This algorithm may be used to analyze user interactions with the digital media content, as well as data received from the other user computer system devices operating within the GPU-based distributed cluster. Accordingly, the GPU, configured to utilize the collaborative filtering algorithm, may create one or more co-occurrence vectors that include the similarities, or lack thereof, between the user's interactions with the digital media content and the interactions of other users with digital media content. These co-occurrence vectors may be transmitted to the digital media service, which may use these vectors to create a matrix that may be used to provide personalized digital media content to the GPU-based distributed cluster.

Thus, as illustrated in FIG. 5, if a user utilizes the interface 502 to select a song from the song selection window 504, the GPU operating within the user's user computer system device may begin to analyze any user interactions associated with the song selection window 504. This may include, but is not limited to, the particular song selected, the artist of the song selected, the album from which the song selected originates, the amplitude and frequency of the song as displayed on the waveform display window 507, any interactions with the song selection slider 508, the volume at which the song is played, and others. These interactions, when analyzed in conjunction with interactions other users have made with the digital media content, can be used to create the co-occurrence vectors which are then transmitted to the digital media service.

Based at least in part on these co-occurrence vectors, the GPU may generate personalized recommendations within the recommendations window 510. Additionally, the user's user computer system device may receive, from the digital media service, personalized digital media content that may also be based at least in part on these co-occurrence vectors. This digital media content may be used to further create more recommendations for the user. For instance, as illustrated in FIG. 5, since the user is currently listening to a song by the artist "Fulano Artista," the digital media service and/or the GPU operating within the user computer system device may inform the user that, based at least in part on the bass intonation of this particular song, the user may be interested in listening to a song with a similar bass intonation. Further, the digital media service and/or the GPU operating within the user computer system device may analyze the particular waveform of the song to determine if other users in the GPU-based distributed cluster are listening to other songs that comprise similar waveform characteristics. Accordingly, the digital media content received from the digital media service may cause the user computer system device to add a listen now button 512 to the recommendations window 510, which the user can utilize to access the song the other users are listening to from the digital media service. Further, the digital media service may use the co-occurrence vectors obtained from the user to provide contemporaneous information that is related to the song. For instance, as illustrated in FIG. 5, the digital media service may use the co-occurrence vectors to provide concert information for "Fulano Artista" based at least in part on the geographic location of the user. Additionally, the digital media service may also use the co-occurrence vectors to inform the user of other users within the GPU-based distributed cluster that are attending the concert. The digital media service may cause the user computer system device to add a purchase tickets button 514 to the recommendations window 510, which the user can utilize to purchase tickets to the concert if so desired.

It should be noted that the elements included in the interface 502 are used for illustrative purposes and, as such, the interface 502 is not limited to these elements. For instance, based at least in part on the user's interactions with the interface 502, the digital media service may provide personalized digital media content including, but not limited to, artwork, videos, online games, music related to similar artists and the like. Further, the interface 502 may be customized based at least in part on the type of digital media content that is to be accessed. For instance, if the interface 502 is configured for viewing videos or other multimedia, the interface 502 may include a video selection window instead of the song selection window 504 illustrated in FIG. 5.

Figure 6:
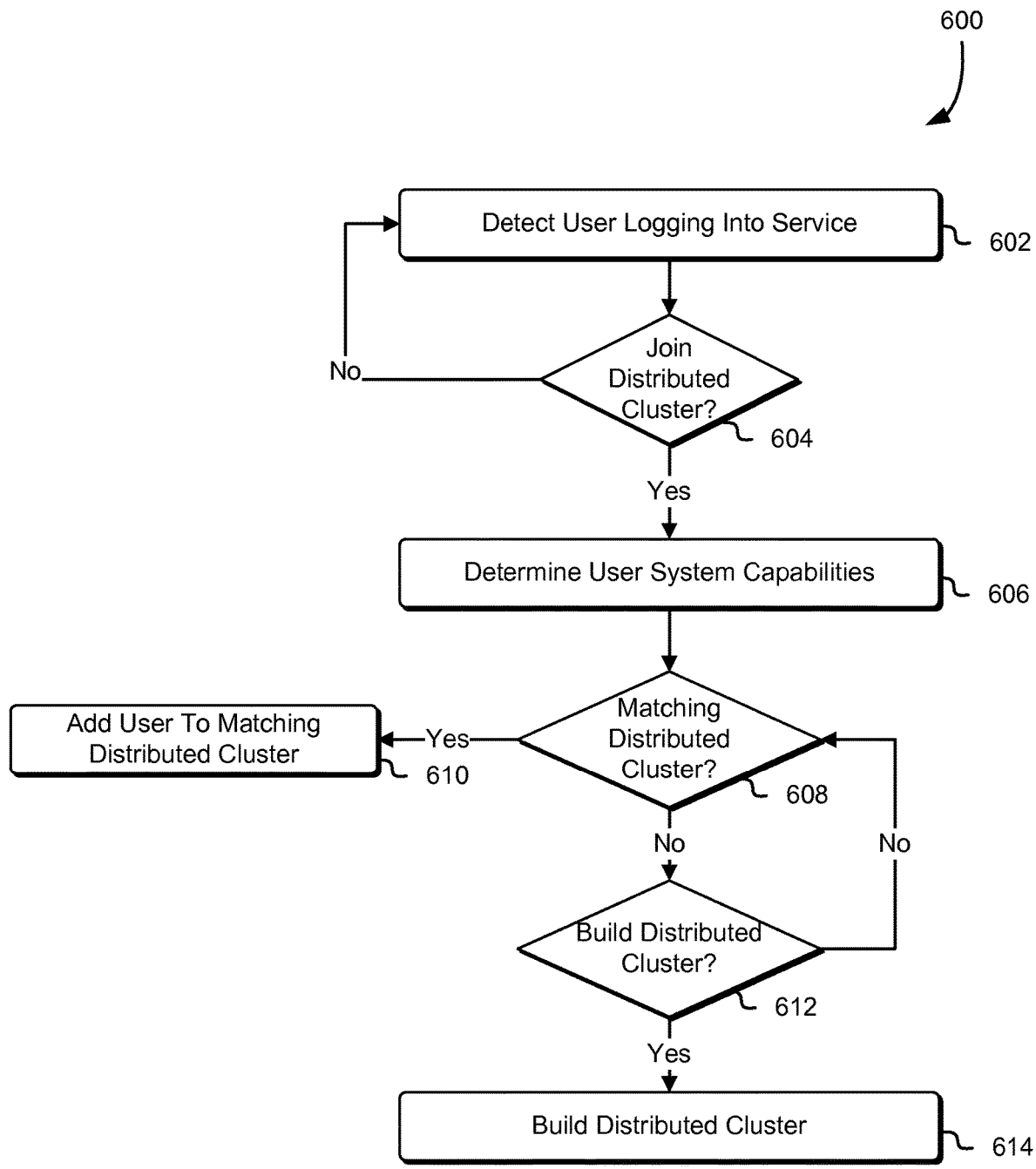
FIG. 6 shows an illustrative example of a process for adding users to a graphics processing unit based distributed cluster in accordance with at least one embodiment.

As noted above, when a user utilizes an interface to access the digital media service, he/she may indicate that the user's user computer system device may be added to a GPU-based distributed cluster. Accordingly, FIG. 6 is an illustrative example of a process 600 for adding users to a GPU-based distributed cluster in accordance with at least one embodiment. The process 600 may be performed by a digital media service configured to transmit one or more commands to user computer system devices to initiate and maintain GPU-based distributed clusters. Additionally, the digital media service may be configured to transmit data to each of the user computer system devices used to access the service, as well as receive data from these devices.

As noted above, a user may utilize an interface through the user computer system device to access the digital media service. This interface may be a software application installed on to the user computer system device, configured to receive requests from the user for digital media content and transmit appropriately configured API calls to the service to obtain this content. Alternatively, the interface may be accessible through one or more communications networks, such as the Internet. The interface may enable a user to specify whether his/her user computer system device may be added to a GPU-based distributed cluster. Additionally, the interface may provide additional information regarding the option to join the cluster, namely what information may be provided to the digital media service and the incentives for being a participant in the cluster (e.g., access to personalized media content and recommendations).

Once the user accesses the interface to utilize the digital media service, the digital media service may detect 602 that the user has logged on to the service to access digital media content. Accordingly, the digital media service may evaluate the user's profile to determine the user's preferences, geographic location, use history and the like. Additionally, the digital media service may determine 604 whether the user has requested that his/her user computer system device be added to a GPU-based distributed cluster. If the user has not specified that his/her user computer system device should be added to a GPU-based distributed cluster, the digital media service may allow the user to continue utilizing the service and continue checking, in future instances, whether the user has opted to have his/her user computer system device join a GPU-based distributed cluster.

If the user has specified that his/her user computer system device should be added to a GPU-based distributed cluster, the digital media service may determine 606 the user computer system device capabilities to identify a compatible GPU-based distributed cluster. For instance, users of the digital media service may utilize different user computer system devices, each having different system capabilities and hardware architectures. For example, multiple organizations may manufacture different types of GPUs, each of which may be programmed using different coding languages and different algorithms. Thus, certain GPUs may not be able to function with different GPUs within a GPU-based distributed cluster. In another instance, users of the digital media service may utilize user computer system devices that each utilizes different operating systems or software. Accordingly, a GPU-based distributed cluster may not function properly if users utilize differing user computer system devices comprising incompatible GPUs, software, other hardware components and the like.

Accordingly, based at least in part on the user computer system device specifications and capabilities, the digital media service may determine 608 whether there are any matching GPU-based distributed clusters. The digital media service may identify one or more GPU-based distributed clusters that include user computer system devices that are compatible with the user's device. Additionally, of these identified GPU-based distributed clusters, the digital media service may verify that the addition of one more device to the cluster may not have any adverse effects (e.g., increased latency, buffer overruns, etc.). Thus, if the digital media service determines that there is a GPU-based distributed cluster that the user computer system device may be added to, the digital media service may proceed to add 610 the user computer system device to the matching GPU-based distributed cluster and transmit one or more executable instructions to all the devices within the cluster to enable communication between the user's user computer system device and the other devices within the cluster.

While the use of compatibility of software and hardware is used throughout the present disclosure to illustrate a process by which a plurality of users may be added to a GPU-based distributed cluster, other criteria may be used to determine whether there exists a matching distributed cluster. For instance, in some embodiments, instead of determining user system capabilities, the digital media service may determine social connections between the user and a plurality of other users in a GPU-based distributed cluster to identify a matching GPU-based distributed cluster. For example, the digital media service may maintain a GPU-based distributed cluster based at least in part on the geographic location of its users to a particular granularity (e.g., neighborhood, city, county, state, country, etc.). In another example, the digital media service may maintain a GPU-based distributed cluster based at least in part on whether its users all are connected with each other through one or more social networking websites.

However, if the digital media service is unable to identify a matching GPU-based distributed cluster to which the user's user computer system device may be added, the digital media service may determine 612 whether a new GPU-based distributed cluster should be built. For instance, if the digital media service has detected that multiple users, each using similar user computer system devices, have opted to add their devices to a GPU-based distributed cluster but no matching GPU-based distributed cluster is currently available, the digital media service may build 614 a new GPU-based distributed cluster comprising these user computer system devices. Accordingly, the digital media service may transmit one or more executable instructions to these user computer system devices to enable these devices to communicate with each other device in the GPU-based distributed cluster and initiate collaborative filtering between the devices.

In some instances, however, the digital media service may be unable to build a GPU-based distributed cluster for these users. For instance, if only a few users utilizing compatible user computer system devices to access the digital media service have opted to join a GPU-based distributed cluster, the digital media service may delay building a new cluster until more compatible devices can be added to the GPU-based distributed cluster. Alternatively, in another instance, the creation of a GPU-based distributed cluster may present additional technical disadvantages. For example, if the creation of a new GPU-based distributed cluster may result in added latency between the user computer system devices to be added to the cluster or the GPUs are incapable of providing calculations expeditiously as part of a cluster, the digital media service may not create the GPU-based distributed cluster. Accordingly, the digital media service may continue to attempt to determine 608 whether any GPU-based distributed clusters match the user computer system device capabilities and specifications until the user computer system device may be added to a cluster.

Figure 7:
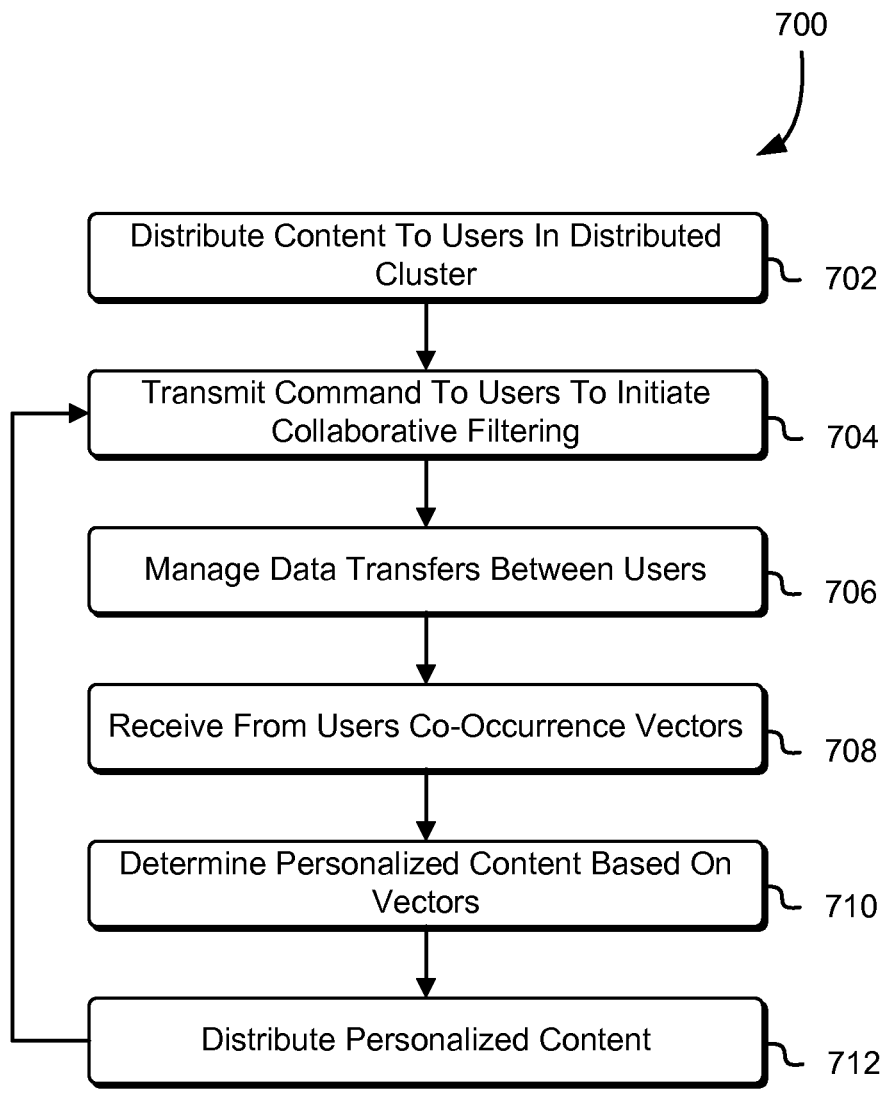
FIG. 7 shows an illustrative example of a process for generating personalized content based at least in part on collaborative filtering between users in a graphics processing unit based distributed cluster in accordance with at least one embodiment.

As noted above, the digital media service may be configured to create and manage one or more GPU-based distributed clusters for the distribution of personalized digital media content to a variety of users. Accordingly, FIG. 7 shows an illustrative example of a process 700 for generating personalized content based at least in part on collaborative filtering between users in a GPU-based distributed cluster in accordance with at least one embodiment. The process 700 may be performed by a digital media service configured to provide users with personalized digital media content based at least in part on user and community preferences and interactions. Additionally, the process 700 may be performed in an environment that includes a GPU-based distributed cluster comprising a number of user computer system devices, each configured to communicate with other devices within the cluster and the digital media service.

Users of the digital media service may access the digital media service in order to request digital media content, which can be used for myriad purposes, such as to support the users' business needs or for personal leisure. Each of these users may be participants in a GPU-based distributed cluster wherein the users collectively interact with digital media content, such as a music database, video database, online sandbox game or other digital media content. Accordingly, the digital media service may distribute 702 digital media content to the user computer system devices operating within the GPU-based distributed cluster. Each user may accordingly utilize his/her user computer system device to interact with the received digital media content.

In addition to distributing the digital media content to the user computer system devices operating within the GPU-based distributed cluster, the digital media service may transmit 704 one or more executable instructions to the GPU within each of the user computer system devices which may cause the GPU to initiate utilizing a collaborative filtering algorithm. The collaborative filtering algorithm may be used by the GPU to analyze user interactions with the received digital media content, as well as the interactions of other users participating in the GPU-based distributed cluster with digital media content. Thus, the user computer system devices operating within the GPU-based distributed cluster may be required to transmit data to the other devices within the cluster.

Accordingly, the digital media service may be configured to manage 706 multiple data transfers between the myriad user computer system devices operating within the GPU-based distributed cluster. For instance, the digital media service may transmit executable instructions to each of the user computer system devices operating within the GPU-based distributed cluster to transfer data pertaining to user interactions after a certain amount of time. The digital media service may determine this amount of time based at least in part on a period of time that may be necessary to obtain an appropriate sample size of user interactions to be able to extract a pattern unique to the user. Alternatively, the digital media service may transmit these executable instructions to a user computer system device once the digital media service has detected that the user has interacted with the digital media content a certain number of times. Accordingly, once a user has interacted with the digital media content a certain number of times, the GPU may analyze and compile these interactions and cause the user computer system device to transmit this data to the other user computer system devices operating within the GPU-based distributed cluster.

Once each of the user computer system devices has transmitted data regarding user interactions with the digital media content to the other user computer system devices operating within the GPU-based distributed cluster, the GPUs within these user computer system devices may begin to calculate one or more co-occurrence vectors. As noted above, these co-occurrence vectors may include similarities, or lack thereof, between the user interactions with the digital media content and the interactions of others within the GPU-based distributed cluster with the digital media content. Thus, these co-occurrence vectors may provide an understanding of the current user and group sentiment and preferences towards the digital media content. Once the GPUs operating within each of the user computer system devices has calculated the one or more co-occurrence vectors, these GPUs may transmit executable instructions to the user computer system devices which may cause these devices to transmit the one or more co-occurrence vectors to the digital media service.

Accordingly, the digital media service may receive 708, from the user computer system devices operating within the GPU-based distributed cluster, the one or more co-occurrence vectors. The digital media service may be configured to compile these co-occurrence vectors into a matrix comprising user interaction similarities among all users participating within the GPU-based distributed cluster. Based at least in part on this matrix, the digital media service may determine each user's sentiments and preferences regarding the digital media content, as well as the sentiments and preferences of the group of users as a whole. With this data, the digital media service, configured to obtain personalized data based at least in part on user preferences, may determine 710 personalized content for each user participating within the GPU-based distributed cluster and for the group as a whole. As noted above, the digital media service may comprise a digital media content data store, which may include a variety of digital media content and components that may be used to create personalized digital media content. Accordingly, the digital media service, based at least in part on the determination of the personalized content to be distributed to the users within the GPU-based distributed cluster, may obtain from the digital media content data store the appropriate digital media content and/or components.

Once the digital media service has obtained the digital media content and/or components from the digital media content data store, the digital media service may distribute 712 this personalized content and/or components to the various user computer system devices operating within the GPU-based distributed cluster. Accordingly, if components are delivered to the various user computer system devices, the GPUs within the various user computer system devices may utilize these components to compile the personalized digital media content that each user may utilize to further their interaction with the digital media service. Further, as users interact with the newly received personalized digital media content, the digital media service may again transmit 704 one or more executable instructions to the GPUs within the user computer system devices to again initiate use of the collaborative filtering algorithm. This may enable the digital media service to continuously receive user interaction data from the user computer system devices operating within the GPU-based distributed cluster and provide personalized distributed content to the users.

Figure 8:
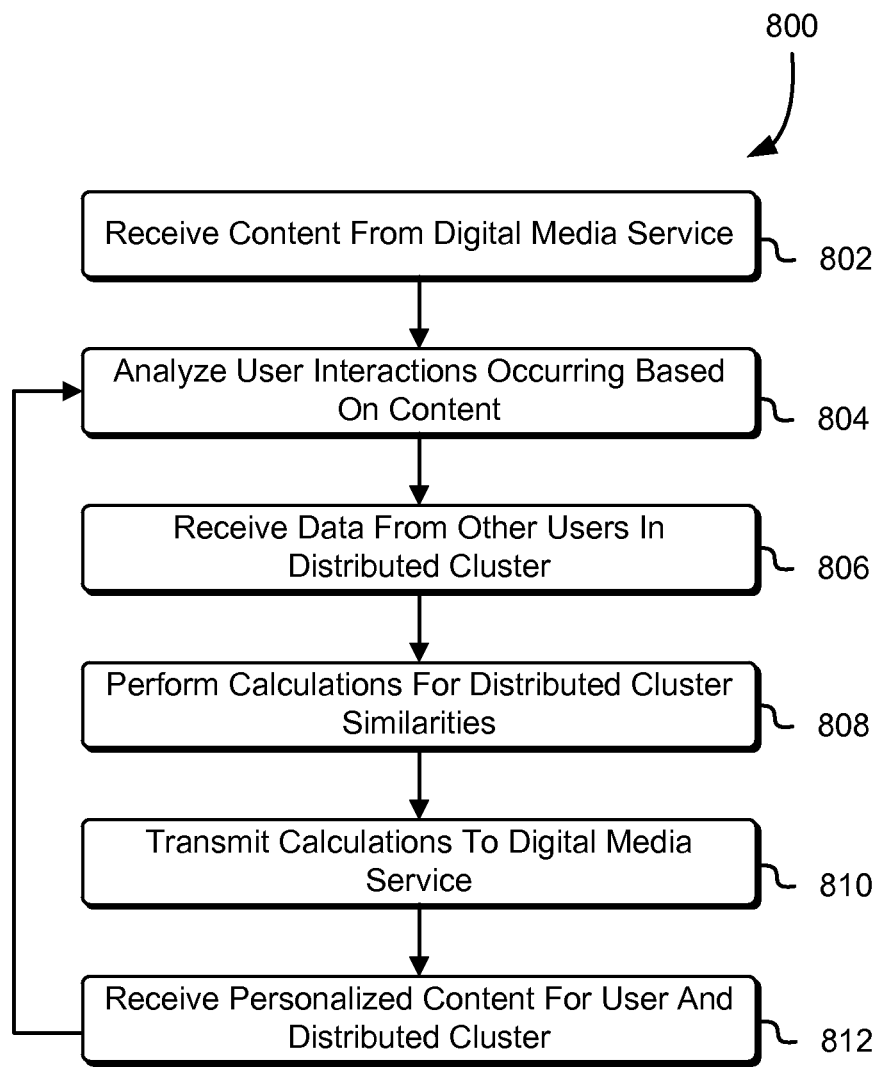
FIG. 8 shows an illustrative example of a process for analyzing user interactions and performing collaborative filtering with other users within a graphics processing unit based distributed cluster in accordance with at least one embodiment.

As noted above, the GPU-based distributed cluster may comprise a variety of user computer system devices operated by one or more users of the digital media service. Each of these user computer system devices may comprise a GPU, which may be configured to perform one or more calculations based at least in part on user interactions with digital media content, as well as data received from other users pertaining to their interactions with the digital media content. Accordingly, FIG. 8 shows an illustrative example of a process 800 for analyzing user interactions and performing collaborative filtering with other users within a GPU-based distributed cluster in accordance with at least one embodiment. The process 800 may be performed by a user computer system device comprising one or more GPUs configured to perform the analyses and calculations noted above. The user computer system device may be configured to transmit data to a digital media service and to receive data from said digital media service.

When a user utilizes his/her user computer system device to access the digital media service, he/she may request certain digital media content. Additionally, the user may specify whether his/her user computer system device may be added to a GPU-based distributed cluster. If the user computer system device is added to a GPU-based distributed cluster, the device may be configured to interact with not only the digital media service, but also other user computer system devices operating within the GPU-based distributed cluster. Based at least in part on the request for certain digital media content, the user computer system device may receive 802 the requested digital media content from the digital media service. Accordingly, this digital media content may be made available to the user for his/her needs.

As the user interacts with the received digital media content, the GPU within the user computer system device may analyze 804 these user interactions occurring based on the digital media content. For instance, the GPU may be configured to evaluate the images and sounds that are output to the user as he/she interacts with the digital media content. Additionally, the GPU may be configured to analyze user interactions with one or more peripheral devices used with the user computer system device, such as a mouse, keyboard, joystick, touch-screen and the like. These user interactions may be redundantly stored within the user computer system device and subsequently transmitted to the other user computer system devices operating within the GPU-based distributed cluster.

As noted above in connection with FIG. 7, the digital media service, once it distributes the digital media content to the various user computer system devices operating within the GPU-based distributed cluster, may transmit one or more executable instructions to the GPU within each of the user computer system devices to initiate a collaborative filtering algorithm. Accordingly, these one or more executable instructions may cause the GPUs to collect and analyze user interactions and transmit this data to the other user computer system devices operating within the GPU-based distributed cluster. Thus, the user computer system device may receive 806 data from the other user computer system devices operating within the GPU-based distributed cluster. This data may include any user interactions with digital media content from other user computer system devices operating within the GPU-based distributed cluster.

Accordingly, this data may be transferred to the GPU, which may be configured to perform 808 one or more calculations based at least in part on the received data and the local user interactions with the digital media content. As part of the collaborative filtering algorithm, the GPU within the user computer system device may generate one or more co-occurrence vectors that may illustrate the similarities, or lack thereof, among the local user's interactions with the digital media content and the interactions of the other users with the digital media content. The GPU may utilize these co-occurrence vectors to provide user recommendations and information based on similarities with other users in the GPU-based distributed cluster. Additionally, the GPU may transmit one or more executable instructions to the user computer system device which may cause the device to transmit 810 these co-occurrence vectors to the digital media service.

As noted above, the digital media service may be configured to utilize these co-occurrence vectors to create a matrix comprising the similarities among all user interactions within the GPU-based distributed cluster. Accordingly, the digital media service may utilize this matrix to determine personalized content for the GPU-based distributed cluster, as a whole, as well as for each user utilizing a user computer system device within the GPU-based distributed cluster. Once the digital media service has made this determination, the digital media service may transmit, such as through one or more appropriately configured API calls, to a digital media content data store one or more requests for digital media content that is to be distributed and/or components that may be used to create personalized content.

Once the digital media service has received the personalized digital media content and/or the components that may be used to create personalized content from the digital media content data store, the digital media service may transmit the content and/or components to each user computer system device operating within the GPU-based distributed cluster. Accordingly, the user computer system device may receive 812, from the digital media service, personalized digital media content and/or components intended for the GPU-based distributed cluster as a whole and the user. If the user computer system device has received one or more components from the digital media service, the GPU within the user computer system device may compile these components to create personalized digital media content based at least in part on programmable software that may be installed on the user computer system device. As the user interacts with this newly received personalized digital media content, the GPU may continue to analyze 804 the user's interactions with this content and continue to utilize the collaborative filtering algorithm to calculate similarities between the users of the various user computer system devices operating within the GPU-based distributed cluster. Thus, the digital media service may be configured to continuously provide personalized digital media content to the various users in the GPU-based distributed cluster.

Figure 9:
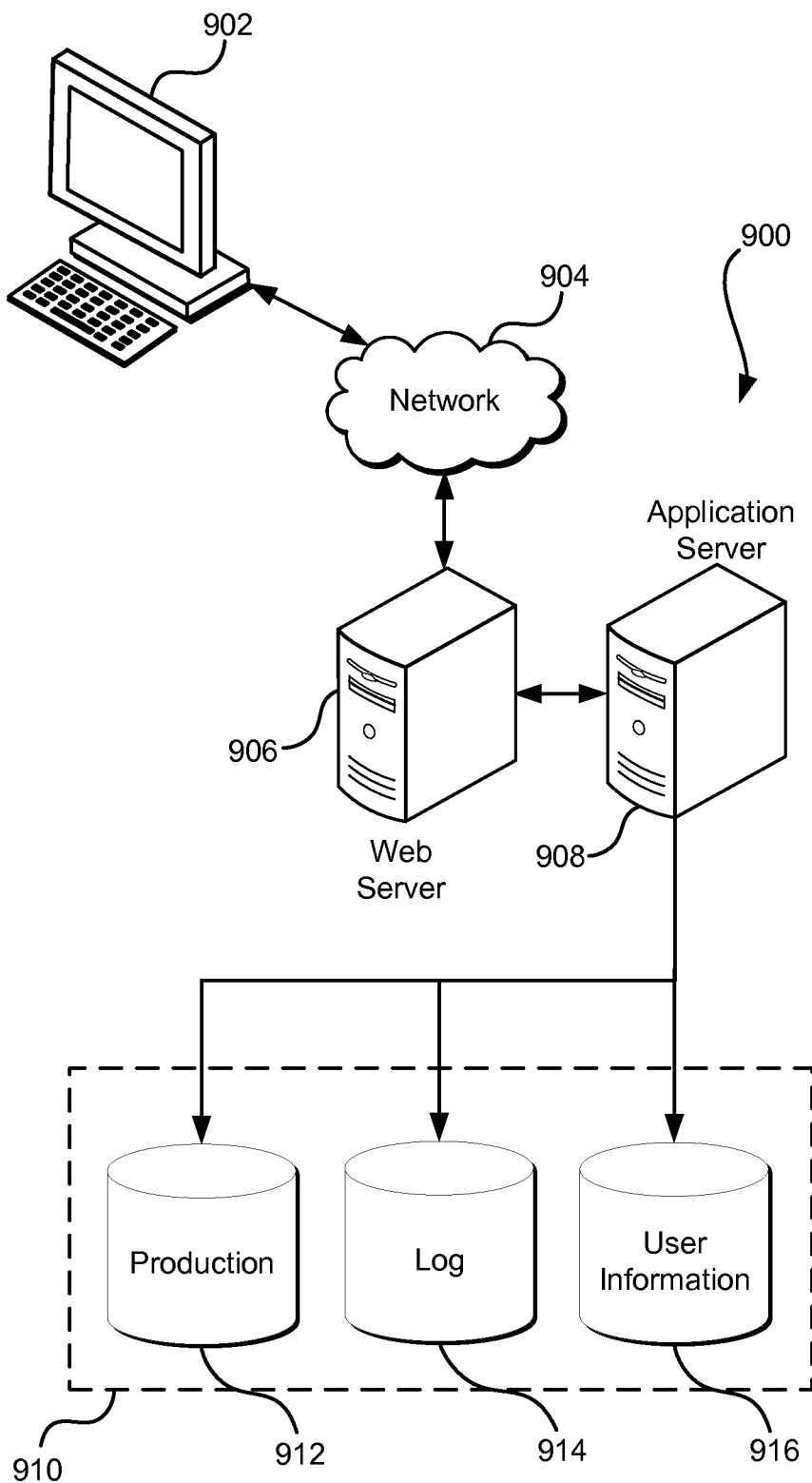
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 902 and the application server 908, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C # or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method comprising:
    distributing digital media content to a plurality of separate user computer systems included in a graphics-processing-unit-based distributed cluster, a first user computer system of the graphics-processing-unit-based distributed cluster comprising hardware including a first graphics-processing-unit that is compatible with a second graphics-processing-unit of a second user computer system of the graphics-processing-unit-based distributed cluster, the compatibility determined based at least in part on the second graphics-processing-unit of the second user computer system being programmed with operating algorithms that allow the second graphics-processing-units to operate collectively with a plurality of graphics-processing-units included in the graphics-processing-unit-based distributed cluster, the first graphics-processing-unit processing user data collectively with the second graphics-processing-unit, where a first user interacts with the digital media content using the first user computer system device;
    transmitting, to the first user computer system devices, one or more executable instructions that, as a result of being executed by the first user computer system, cause the first user computer system to transmit a first set of user interactions associated with the digital media content recorded by the first user computer system to the second user computer system;
    transmitting, to the second user computer system devices, the one or more executable instructions that, as a result of being executed by the second user computer system, cause the second user computer system to calculate a co-occurrence vector based at least in part on the first set of user interactions and a second set of user interactions recorded by the second user computer system;
    receiving, from the second user computer system the co-occurrence vector, the co-occurrence vector indicating similarities between the first set of user interactions and the second set of user interactions;
    generating a matrix by at least combining the co-occurrence vector with at least one other co-occurrence vector obtained from at least one other user computer system of the graphics-processing-unit-based distributed cluster;
    generating, based at least in part on the matrix, personalized digital media content for at least one user computer system of the graphics-processing-unit-based distributed cluster; and
    distributing the personalized digital media content to the at least one user computer system.

2. The computer-implemented method of claim 1, wherein the operating algorithms further comprise a collaborative filtering algorithm.

3. The computer-implemented method of claim 1, wherein the first user computer system is added to the graphics-processing-unit-based distributed cluster as a result of selecting an option to join the graphics-processing-unit-based distributed cluster.

4. The computer-implemented method of claim 1, wherein the first user computer system is added to the graphics-processing-unit-based distributed cluster based at least in part on a social connection with at least one other user associated with the graphics-processing-unit-based distributed cluster.

5. A system, comprising at least one computing device configured to implement one or more services, wherein the one or more services:
    provide content to a first device of a plurality of devices that define at least a portion of a graphics-processing-unit-based distributed cluster, the first device including a first graphics-processing-unit that is compatible with graphics-processing-units of the other devices of the graphics-processing-unit-based distributed cluster, the compatibility determined based at least in part on a second graphics-processing-unit of a second device including executable instructions that, as a result of being executed, implement algorithms that allow the second graphics-processing-unit to operate collectively with other members of the graphics-processing-unit-based distributed cluster;
    provide, to the first device, executable instructions that, as a result of being executed, cause the first device to generate a collection of information associated with the content based at least in part on user interactions with the content through the first device;
    cause the collection of information to be provided to a second device of the plurality of devices, receipt of the collection of information causing the second device to generate a co-occurrence vector based at least in part on the collection of information and user interactions with the content through the second device;
    generate, based at least in part on a matrix of one or more co-occurrence vectors including the co-occurrence vector, new content for at least a subset of devices of the plurality of devices; and
    store the new content.

6. The system of claim 5, wherein the collection of information associated with the content is further determined based at least in part on a collaborative filtering algorithm and data received from other devices of the plurality of devices.

7. The system of claim 5, wherein one or more devices of the plurality of devices in the graphics-processing-unit-based distributed cluster comprise one or more graphics processing units configured to determine one or more characteristics of use associated with the content.

8. The system of claim 5, wherein the one or more services are further configured to add a device to the plurality of devices in the graphics-processing-unit-based distributed cluster based at least in part on an option selected by a user of the device to add the device to the graphics-processing-unit-based distributed cluster.

9. The system of claim 7, wherein the one or more characteristics of use include similarities among interactions with the content through the individual devices and interactions with the content from one or more other devices of the plurality of devices in the graphics-processing-unit-based distributed cluster.

10. The system of claim 7, wherein the determined one or more characteristics of the use of the content are compiled into the one or more co-occurrence vectors, which are used by the one or more services to calculate a matrix usable for generating the new content.

11. The system of claim 5, wherein one or more devices of the plurality of devices were added to the graphics-processing-unit-based distributed cluster based at least in part on an option selected to specify authorization for addition to the graphics-processing-unit-based distributed cluster and at least in part on social similarities among a plurality of users of the plurality of devices.

12. A non-transitory computer-readable storage medium storing thereon executable instructions that, as a result of being executed by one or more processors of a computer system; cause the computer system to at least:
  obtain a set of co-occurrence vectors generated by a graphics-processing-unit-based distributed cluster of devices by at least distributing executable instructions to a set of devices of the graphics-processing-unit-based distributed cluster, thereby causing the set of devices to perform one or more operations to generate the set of co-occurrence vectors based at least in part on user interactions with content through the set of devices, the graphics-processing-unit-based distributed cluster of devices determined based at least in part on content being processed by the set of devices in the graphics-processing-unit-based distributed cluster;
  generate a matrix based at least in part on the set of co-occurrence vectors;
  generate, based at least in part on the matrix, personalized content for at least one device of the set of devices; and
  store the generated personalized content to be provided for future use, wherein the set of devices of the graphics-processing-unit-based distributed cluster respectively comprises a graphics-processing-unit that is compatible with graphics-processing-units of the other devices of the graphics-processing-unit-based distributed cluster, the compatibility determined based at least in part on comprises graphics-processing-units of the set of devices executing algorithms that allow the graphics-processing-units to operate collectively.

13. The non-transitory computer-readable storage medium of claim 12, wherein the executable instructions further cause one or more graphics-processing-units in the set of devices to generate the set of co-occurrence vectors.

14. The non-transitory computer-readable storage medium of claim 12, wherein the computer system is a master node within the graphics-processing-unit-based distributed cluster that provides coordination among the set of devices.

15. The non-transitory computer-readable storage medium of claim 12, wherein the set of co-occurrence vectors is generated using a collaborative filtering algorithm.

16. The non-transitory computer-readable storage medium of claim 12, wherein the set of co-occurrence vectors indicates similarities among interactions with the content through the set of device.

17. The non-transitory computer-readable storage medium of claim 12, wherein the executable instructions further cause the computer system to add a device to the graphics-processing-unit-based distributed cluster of devices based at least in part on an option selected by a user of the device to add the device to the graphics-processing-unit-based distributed cluster of devices.

18. The computer-implemented method of claim 1, wherein the similarities between the first set of user interactions and the second set of user interactions further comprise an interaction with a user interface element that causes the digital media content to play.

19. The computer-implemented method of claim 1, wherein the first set of user interactions further comprises an interaction with at least one of: a selection of a particular song, an artist associated with the particular song, an album associated with the particular song, an amplitude of the particular song in waveform, a frequency of the particular song in waveform, a slider associated with the particular song, and a volume associated with the particular song.

20. The non-transitory computer-readable storage medium of claim 12, wherein the user interactions further comprise at least one of: selecting a song, selecting an artist, selecting an album, and selecting a volume level.

* * * * *